United States Patent [19]

Rose

[11] 3,966,004

[45] June 29, 1976

[54] SINGLE LINK SLIDE RAIL SUSPENSION SYSTEM

[75] Inventor: Edgar Rose, Glencoe, Ill.

[73] Assignee: Outboard Marine Corporation, Waukegan, Ill.

[22] Filed: July 22, 1974

[21] Appl. No.: 490,286

[52] U.S. Cl. .................................. 180/5 R; 305/30
[51] Int. Cl.² ......................................... B62M 27/02
[58] Field of Search .................... 180/5 R, 9, 9.2 R; 305/29, 30, 31, 32, 35 R

[56] References Cited
UNITED STATES PATENTS

| | | | |
|---|---|---|---|
| 2,789,438 | 4/1957 | Hutchinson | 305/32 |
| 3,690,394 | 9/1972 | Skime | 180/5 R |
| 3,800,897 | 4/1974 | Irvine | 180/5 R |
| 3,840,082 | 10/1974 | Olson | 180/5 R |

Primary Examiner—M. H. Wood, Jr.
Assistant Examiner—John A. Carroll
Attorney, Agent, or Firm—Michael, Best & Friedrich

[57] ABSTRACT

Disclosed herein is a snowmobile including a track drive sprocket mounted on a frame, a track suspension carrier including, adjacent to forward end thereof, an upwardly and forwardly extending lower surface, and a suspension link pivotally connected to the carrier rearwardly of the surface and pivotally connected to the frame rearwardly of the sprocket, the suspension link constituting the sole rigid connection between the carrier and the frame. In addition, there is also disclosed means urging the forward end of the carrier away from said frame, and means for damping movement of the carrier relative to the frame.

11 Claims, 4 Drawing Figures

SINGLE LINK SLIDE RAIL SUSPENSION SYSTEM

BACKGROUND OF THE INVENTION

The invention relates generally to snowmobile track suspensions and particularly to slider type suspension systems. However, the invention also relates to such suspension which include a plurality of bogie wheels carried on a supporting carrier pivotally suspended from the snowmobile chassis.

Attention is directed to the following U.S. Pat. Nos.:
Swenson — 3,485,312 issued Dec. 23, 1969
Brandli — 3,613,811 issued Oct. 19, 1971
Skime — 3,690,394 issued Sept. 12, 1973
Duclo — 3,719,242 issued Mar. 6, 1973

In the disclosure of all of the above patents, a slider-suspension frame is supported from a chassis by both forward and rearward links which control movement of the suspension frame.

SUMMARY OF THE INVENTION

In accordance with the invention, there is provided a snowmobile comprising a track driving sprocket mounted on a frame or chassis, a track suspension carrier including, adjacent the forward end thereof, an upwardly and forwardly extending lower surface, a suspension link pivotally connected to the carrier rearwardly of the surface and pivotally connected to the frame rearwardly of the sprocket, which suspension link constitutes the sole rigid connection between the carrier and the frame, and means urging the carrier away from the frame.

In accordance with one embodiment of the invention, the link is pivotally connected to the frame forwardly of the pivotal connection of the link to the carrier.

In accordance with one embodiment of the invention, the link includes a portion extending rearwardly from the connection with the carrier and further includes an idler wheel carried by the extending link portion adjacent to the rearward end thereof.

In accordance with one embodiment of the invention, an idler wheel is mounted on the track suspension carrier adjacent to the rearward end thereof.

In accordance with one embodiment of the invention, the means urging the carrier away from the frame urges the forward end of the carrier away from the frame. The means urging the carrier away from the frame can comprise a spring reacting between the link and the frame, or a spring reacting between the carrier and the frame, or a spring reacting between the link and the carrier.

Also in accordance with the invention, means are provided for damping movement of the carrier relative to the chassis or frame. In one embodiment, such means damps movement of the link relative to the frame and in another embodiment such means damps movement of the link relative to the carrier. In still another embodiment, means are provided for damping movement of the link relative to both the frame and the carrier.

One of the principal features of the invention is the provision of a snowmobile including a track suspension system including a suspension carrier movably connected to the frame by a single suspension link.

Another of the principal features of the invention is the provision of a snowmobile, as referred to in the preceding paragraph, including spring means urging the carrier away from the frame and in particular, urging the forward end of the carrier away from the frame.

Another of the principal features of the invention is the provision of a snowmobile including a track suspension system incorporating a suspension carrier movably connected to the frame or chassis by a single suspension link, together with means damping movement of the carrier relative to the frame. Such means can comprise means damping the link relative to one or both of the frame and carrier.

Another principal feature of the invention is the provision of a snowmobile track suspension system which provides little opportunity for accumulation of ice and snow therein and which is relatively inexpensive to construct and which will provide reliable service over a long and useful life.

Other features and advantages of the invention will become known by reference to the following specification, claims, and drawings.

DRAWINGS

Figure 1:
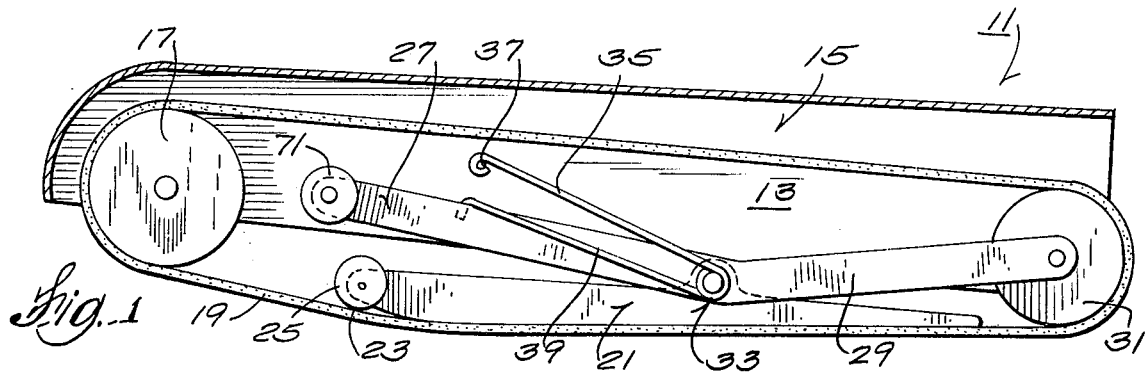
FIG. 1 is a schematic, side elevational view of a snowmobile track suspension system embodying various of the features of the invention.

Before explaining the invention in detail, it is to be understood that the invention is not limited in its application to the details of construction and arrangements of parts set forth in the following general description or illustrated in the accompanying drawings since the invention is capable of other embodiments and of being practiced or carried out in various ways. Also it is to be understood that the phraseology or terminology employed herein is for the purpose of description and not of limitation.

GENERAL DESCRIPTION

Shown schematically in FIGS. 1 through 4 of the drawings are respective snowmobiles 11, 111, 211 and 311 including respective track suspension systems 13, 113, 213 and 313. In general, and in accordance with the invention, the snowmobiles 11, 111, 211 and 311 each include a frame or chassis 15 which can be of any suitable construction.

The snowmobiles 11, 111, 211 and 311 further each include a track drive sprocket 17 which is rotatably mounted on the frame or chassis 15 in any suitable manner and which is driven by any suitable power source in any suitable way. Trained around the sprocket 17 is an endless track or drive belt 19.

Also included in each of the snowmobiles 11, 111, 211 and 311 is a slider support or carrier 21 having, at its forward end, one or more acuately upwardly and forwardly extending lower surfaces 23 which can be provided by one or more idler wheels 25 or which can otherwise be provided. The upwardly and forwardly extending lower surfaces 23 engage the belt 19 as it is driven rearwardly by the sprocket 17.

The carrier 21 can be constructed in any suitable manner and can include slide rails (not shown) or a suitable series of bogie wheels.

In accordance with the invention, each carrier 21 is pivotally supported from the chassis 15 by a single suspension link 27 (which may include more than one transversely spaced and aligned link members which act in unison and which therefore can be regarded as a single link).

Still more particularly, the link 27 is pivotally connected to the carrier 21 rearwardly of the upwardly and forwardly extending lower surface 23 and is pivotally connected to the chassis 15. In the preferred embodiments shown in FIGS. 1 through 4, the suspension links 27 are all pivoted to the chassis 15 at a point located forwardly of the pivotal connection of the links 27 to the carriers 21. However, connection of the link 27 to the chassis 15 rearwardly of the connection of the link 27 to the carrier 21 is within the scope of the invention.

Figure 2:
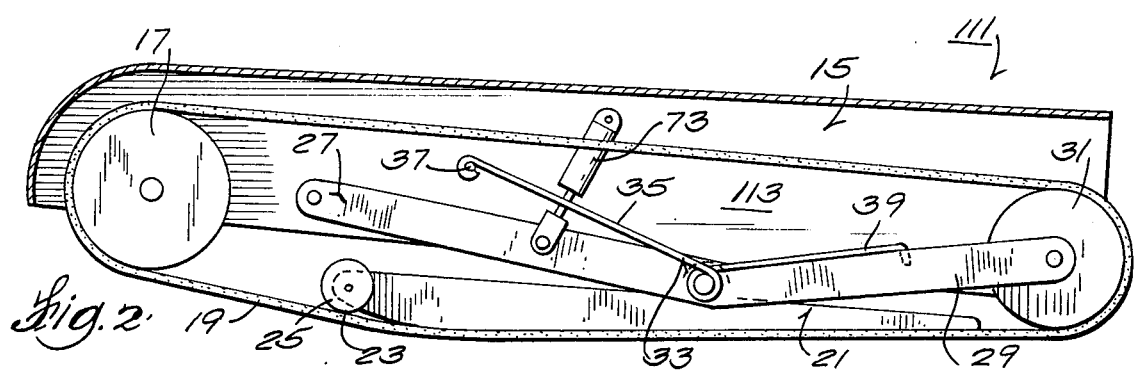
FIG. 2 is a view similar to FIG. 1 illustrating another embodiment of a snowmobile track suspension system embodying various of the features of the invention.

In the construction shown in FIGS. 1 and 2, each link 27 includes a portion 29 which extends rearwardly of the pivotal connection between the link 27 and the carrier 21 and, adjacent its rearward end, rotatably supports an idler wheel 31 around which the track is also trained.

In further accordance with the invention, means are provided for biasing the carrier 21 away from the chassis or frame 15 and preferably for biasing the forward end of the carrier 21 away from the frame 15. Various arrangements can be employed. In the construction shown in FIGS. 1 and 2, spring means acting between the chassis 15 and the link 27 is employed to pivot the link 27 so as to urge away from the chassis 15 the pivotal connection between the link 27 and the carrier 21, and thereby urge the carrier 21 away from the chassis 15. Various spring arrangements acting between the chassis 15 and the link 27 can be employed. In FIG. 1 there is disclosed a helical torsion spring 33 having a central coil portion supported generally coaxially with the pivotal connection between the link 27 and the carrier 21, an end portion 35 engaged against a stop 37 on the chassis 15, and another end portion 39 engaged with the upper surface of the link 27 so as to pivot the link 27 in the clockwise direction as shown in FIG. 1.

In the biasing arrangement employed in the construction shown in FIG. 2, the end 39 of the spring 33 is engaged against the upper surface of the rearward link portion 29 to urge the link 27 in the clockwise direction, around the connection of the link 27 to the chassis 21. Arrangements for mounting the coil portion of the spring other than disclosed herein can also be employed and, in addition, other types of spring arrangements can also be employed for rotating the link 27 in the clockwise direction about the pivotal connection between the link and the chassis.

If the link 27 was pivotally mounted to the chassis 15 rearwardly of the pivotal connection of the link 27 to the carrier 21 then the biasing means would be employed to rotate the link 27 in the counterclockwise direction so as to displace the pivotal connection of the link 27 to the carrier 21 away from the chassis 15.

When the biasing means is employed between the chassis 15 and the link 27, the carrier 21 is free to pivot relative to the link 27 subject to the confining action of the belt which is trained around the carrier.

Figure 3:
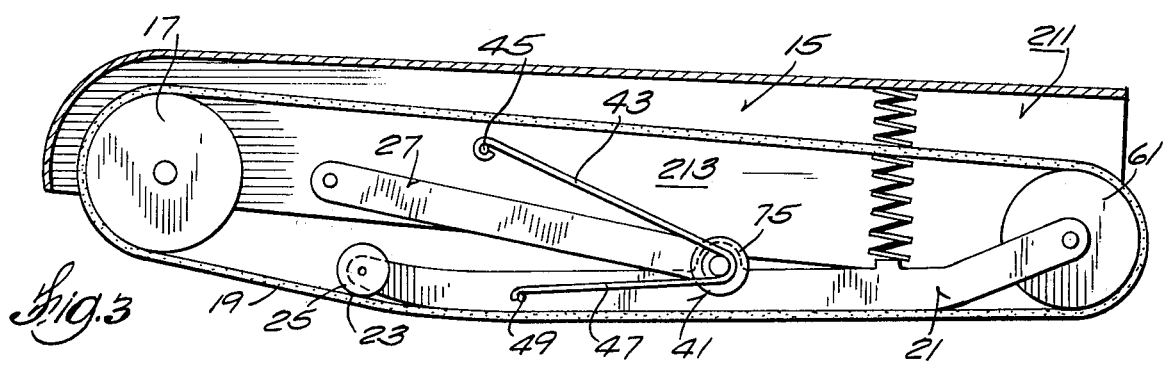
FIG. 3 is a schematic, side elevational view of another snowmobile track suspension system embodying various of the features of the invention.
Figure 4:
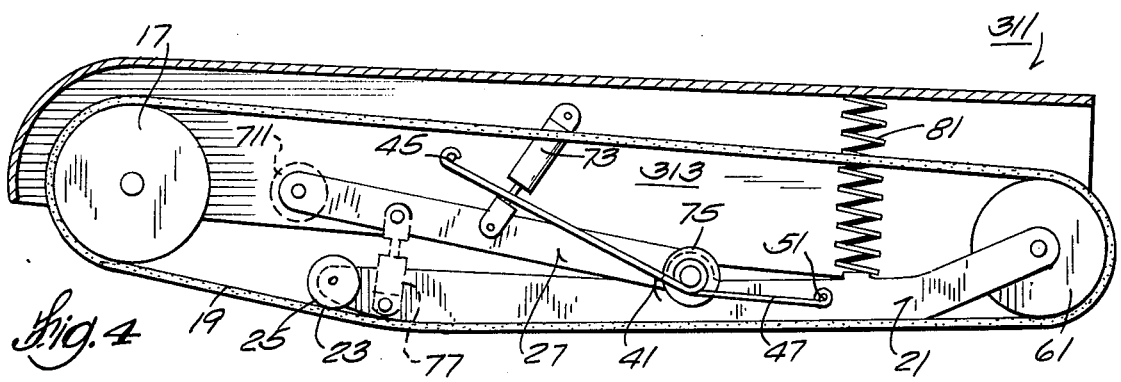
FIG. 4 is a view similar to FIG. 3 illustrating still another embodiment of a snowmobile track suspension system embodying various of the features of the invention.

In the arrangement shown in FIGS. 3 and 4 the means for biasing the carrier 21 away from the chassis 15 includes spring means acting between the chassis 15 and the carrier 21. More specifically, the spring means includes a helical torsion spring 41 having a central coil portion which can be arranged coaxially with the connection of the link 27 to the carrier 21, an end portion 43 engaged with a stop 45 on the chassis 15 and one other end portion 47 engaged (in the FIG. 3 construction) against a stop 49 on the carrier 21 forwardly of the pivotal connection with the link 27 in such manner as to urge the forward end of the carrier 21 away from the chassis 15, i.e., to rotate the carrier 21 in the counterclockwise direction relative to the chassis 15 as shown in FIG. 3. In the FIG. 4 construction, the other spring end portion 47 is engaged against a stop 51 located rearwardly of the pivotal connection of the link 27 to the carrier 21, but the overall arrangement is such as to yieldably displace the forward end of the carrier 21 away from the chassis 15.

The coil portion of the spring 41 employed in the FIGS. 3 and 4 embodiments could be located other than coaxially with the pivotal connection between the link 27 and the carrier 21 and other spring arangements can be employed to bias the forward end of the carrier 21 away from the chassis 15.

In the construction shown in FIGS. 3 and 4, the carrier 21 supports, at its rearward end, one or more coaxially mounted idler wheels 61 around which the track or belt 19 is also trained.

Employment of a single link 27 as disclosed herein for supporting the carrier 21 from the chassis 15 advantageously avoids excessive ice and snow accumulation in the suspension, whereas employment of other linkages can encourage greater ice and snow accumulation in the suspension.

If desired, damping of the movement of the carrier 21 and of the link 27 relative to each other and to the frame or chassis 15 can be provided. In this regard, various arrangements can be employed for damping movement of the link 27 relative to the chassis 15 and thereby also damping movement of the carrier 21 relative to the chassis 15. For instance, in FIG. 1, there is disclosed a schematically illustrated rotary shock absorber 71 mounted coaxially with the pivotal mounting of the link 27 to the chassis 15 and operatively connected between the link 27 and the chassis 15. As the constructional details of rotary shock absorbers are believed to be well known, no further description thereof is believed to be necessary.

In the construction shown in FIG. 2, a schematically illustrated linear shock absorber 73 in the form of a hydraulic cylinder piston device is pivotally connected between the link 27 and the chassis 15 to damp pivotal movement of the link 27 relative to the chassis 15. As already pointed out, such damping also serves to damp movement of the carrier 21 relative to the chassis 15.

In the construction shown in FIG. 3, there is provided means for damping movement between the link 27 and the carrier 21 and thereby also to damp relative movement between the carrier 21 and the chassis 15. While other arrangements could be employed, a schematically illustrated rotary shock absorber 75 is mounted coaxially with the pivotal connection of the link 27 to the carrier 21 and is operatively connected to the link 27 and to the carrier 21. If desired, a schematically illustrated linear shock absorber, such as the hydraulic cylinder piston device 77 shown in dotted outline in FIG. 4 could be mounted between the link 27 and the carrier 21 to damp swinging movement therebetween.

In the construction illustrated in FIG. 4, movement of the carrier 21 is damped by employment of both the rotary shock absorber 75 between the link 27 and the carrier 21 and the linear shock absorber 73 between the link 27 and the chassis 15. As shown in dotted outline, the rotary shock absorber 71 could be employed in lieu of, or in addition to, the linear shock absorber 73. As also shown in dotted outline, the linear shock absorber 77 could be employed between the link 27 and the carrier 21 in lieu of, or in addition to, the rotary shock absorber 75.

It is to be understood that the damping arrangements referred to above can be used in any of the snowmobiles 11, 111, 211 and 311 and with any of the carrier biasing arrangements in any combination thereof.

Still further in addition, as shown in FIGS. 3 and 4, a coil spring 81 can be operatively arranged between the carrier 21 and the chassis 15 to restrain movement of the carrier 21 relative to the chassis 15. The spring 81 can be mounted in various ways. In the illustrated construction, the spring 81 is fixed to the carrier 21 and movably engages the chassis 15. However, the spring 81 could be fixed to the chassis 15 and movably engaged with the carrier 21. Alternatively, the spring 81 could be fixedly located with respect to both the chassis 15 and the carrier 21.

It is noted that the connection of the carrier 21 to the chassis 15 provided by the link 27 does not and can not involve any variation in the distance between the pivotal connections of the link 27 to the carrier 21 and to the frame 15. In this sense, the connection of the carrier 21 to the frame 15 can be said to be "rigid" while permitting relative movement between the carrier 21 and the frame 15.

Various of the features of the invention are set forth in the following claims:

What is claimed is:

1. A snowmobile comprising a frame, a track drive sprocket mounted on said frame, a track suspension carrier including, adjacent to the forward end thereof, an upwardly and forwardly extending lower surface, a suspension link pivotally connected at one end to said frame rearwardly of said sprocket and pivotally connected to said carrier rearwardly of said surface, said suspension link constituting the sole rigid link connecting between the carrier and said frame and including a portion extending rearwardly from the connection of said link with said carrier, an idler wheel rotatably carried by said extending link portion adjacent to the rearward end thereof, and means urging said carrier away from said frame.

2. A snowmobile in accordance with claim 1 wherein said link is pivotally connected to said frame forwardly of the pivotal connection of said link to said carrier.

3. A snowmobile in accordance with claim 1 wherein an idler wheel is mounted on said carrier at the rearward end thereof.

4. A snowmobile in accordance with claim 1 wherein said means urging said carrier away from said frame urges the forward end of the carrier away from said frame.

5. A snowmobile in accordance with claim 4 wherein said means urging said carrier away from said frame includes a spring having opposed ends reacting respectively between said frame and said link.

6. A snowmobile in accordance with claim 4 wherein said means urging said carrier away from said frame includes a spring having opposed ends reacting respectively between said link and said carrier.

7. A snowmobile in accordance with claim 1 wherein said means urging said carrier away from said frame includes a spring reacting between said frame and said carrier.

8. A snowmobile in accordance with claim 1 including means damping movement of said carrier relative to said frame.

9. A snowmobile in accordance with claim 8 wherein said damping means comprises a shock absorber reacting between said link and said frame.

10. A snowmobile in accordance with claim 8 wherein said damping means comprises a shock absorber reacting between said link and said carrier.

11. A snowmobile in accordance with claim 8 wherein said damping means comprises a shock absorber reacting between said link and said frame and a second shock absorber reacting between said link and said carrier.

* * * * *